(12) United States Patent
Taylor

(10) Patent No.: US 11,849,779 B2
(45) Date of Patent: Dec. 26, 2023

(54) METHOD OF MANUFACTURING A FLEXIBLE, IMPACT-RESISTANT PAD

(71) Applicant: SMC Mouldings Limited, Burnley (GB)

(72) Inventor: David Taylor, Burnley (GB)

(73) Assignee: SMC Mouldings Limited, Burnley (GB)

( * ) Notice: Subject to any disclaimer, the term of this patent is extended or adjusted under 35 U.S.C. 154(b) by 437 days.

(21) Appl. No.: 15/733,479

(22) PCT Filed: Dec. 5, 2018

(86) PCT No.: PCT/EP2018/025309
§ 371 (c)(1),
(2) Date: Aug. 6, 2020

(87) PCT Pub. No.: WO2019/154474
PCT Pub. Date: Aug. 15, 2019

(65) Prior Publication Data
US 2021/0100297 A1 Apr. 8, 2021

(30) Foreign Application Priority Data
Feb. 12, 2018 (GB) .................... 1802226

(51) Int. Cl.
*A41D 13/00* (2006.01)
*A41D 31/00* (2019.01)
(Continued)

(52) U.S. Cl.
CPC ....... *A41D 13/0156* (2013.01); *A41D 31/285* (2019.02); *B29C 43/003* (2013.01);
(Continued)

(58) Field of Classification Search
CPC .............. A41D 13/0156; A41D 31/285; B29C 43/003; B29C 43/021; B29C 43/36;
(Continued)

(56) References Cited

U.S. PATENT DOCUMENTS

| 1,283,724 | A | * | 11/1918 | Gammeter | ................ B26F 1/00 83/657 |
| 3,020,186 | A | * | 2/1962 | Lawrence | ................ B32B 27/00 206/820 |
| 3,850,064 | A | * | 11/1974 | Dwyer | ..................... B26F 1/00 83/139 |

* cited by examiner

*Primary Examiner* — Linda L Gray
(74) *Attorney, Agent, or Firm* — Woodard, Emhardt, Henry, Reeves & Wagner, LLP

(57) ABSTRACT

A method of manufacturing a flexible, impact-resistant pad (1), primarily for use in an item of protective wear, comprises the following steps. First, a sheet (16) of impact-absorbing material (3, 4, 4), for example a closed-cell foam is provided. The sheet (16) is cut to provide a piece (16) with a profile required for the pad (1) and this piece (16) is then cut into a plurality of spaced, separate elements (2), which are retained within the required profile of the pad (1). A first, flexible layer (17, 4) of material (3) is provided and one side of same is bonded to the spaced, separate elements (2). The edge (5) of the pad (1) is streamlined by the following additional steps which may be carried out either before cutting of the sheet (16) into the plurality of spaced, separate elements (2) or after bonding of the first, flexible layer (17, 4) of material (3) to the spaced, separate elements (2). First, a contoured mould tool (8) is provided that defines a recess (9) having a shape complementary to the shape required on one side of the pad (1) and a streamlined edge (10) around at least part of its periphery. The impact-absorbing material (3, 4, 4) or the mould tool (8) is heated and the mould tool (8) is then pressed into it to mould it on one side to define the shape that is required. Preferably, the method comprises (Continued)

the further step of bonding a second flexible layer (17, 4) of material (4) to the moulded side of the pad (1). During bonding of this second flexible layer (17, 4) of material (4), the pad (1) is preferably supported on a yielding surface (23) to enable the moulded side of the pad (1) to flatten during bonding. Also provided is a flexible, impact-resistant pad (1) Comprising a first, flexible layer (17, 4) of material (3) and a plurality of spaced, separate elements (2) that are each comprised of an impact-absorbing material (3, 4, 4) and that are bonded to one side of the first flexible layer (17, 4) of material (3). At least some of the elements (2) adjacent the edge (5) of the pad (1) are streamlined around at least part of the periphery of the pad (1).

14 Claims, 9 Drawing Sheets

(51) Int. Cl.
| | | |
|---|---|---|
| | *B32B 3/02* | (2006.01) |
| | *B32B 5/26* | (2006.01) |
| | *B32B 27/08* | (2006.01) |
| | *B32B 27/12* | (2006.01) |
| | *B32B 27/32* | (2006.01) |
| | *B32B 27/40* | (2006.01) |
| | *B32B 38/00* | (2006.01) |
| | *B29C 43/36* | (2006.01) |
| | *A41D 13/015* | (2006.01) |
| | *A41D 31/28* | (2019.01) |
| | *B32B 3/08* | (2006.01) |
| | *B32B 5/02* | (2006.01) |
| | *B29C 43/00* | (2006.01) |
| | *B29C 43/02* | (2006.01) |
| | *B32B 38/18* | (2006.01) |
| | *B32B 37/12* | (2006.01) |
| | *B32B 5/18* | (2006.01) |

(52) U.S. Cl.
CPC ............ *B29C 43/021* (2013.01); *B29C 43/36* (2013.01); *B32B 3/02* (2013.01); *B32B 3/08* (2013.01); *B32B 5/024* (2013.01); *B32B 5/026* (2013.01); *B32B 5/26* (2013.01); *B32B 27/08* (2013.01); *B32B 27/12* (2013.01); *B32B 27/32* (2013.01); *B32B 27/40* (2013.01); *B32B 38/185* (2013.01); *B29C 2793/009* (2013.01); *B32B 5/18* (2013.01); *B32B 2037/1215* (2013.01); *B32B 2262/0207* (2013.01); *B32B 2262/0276* (2013.01); *B32B 2266/025* (2013.01); *B32B 2266/08* (2013.01); *B32B 2305/02* (2013.01); *B32B 2307/558* (2013.01); *B32B 2571/00* (2013.01); *B32B 2601/00* (2013.01); *Y10T 156/1077* (2015.01)

(58) Field of Classification Search
CPC ....... B29C 2793/009; B32B 3/02; B32B 3/08; B32B 5/024; B32B 5/026; B32B 5/26; B32B 27/08; B32B 27/12; B32B 37/32; B32B 27/40; B32B 38/185; B32B 5/18; B32B 2037/1215; B32B 2262/0207; B32B 2262/0276; B32B 2266/025; B32B 2266/08; B32B 2305/02; B32B 2307/558; B32B 2571/00; B32B 2601/00; Y10T 156/1077
See application file for complete search history.

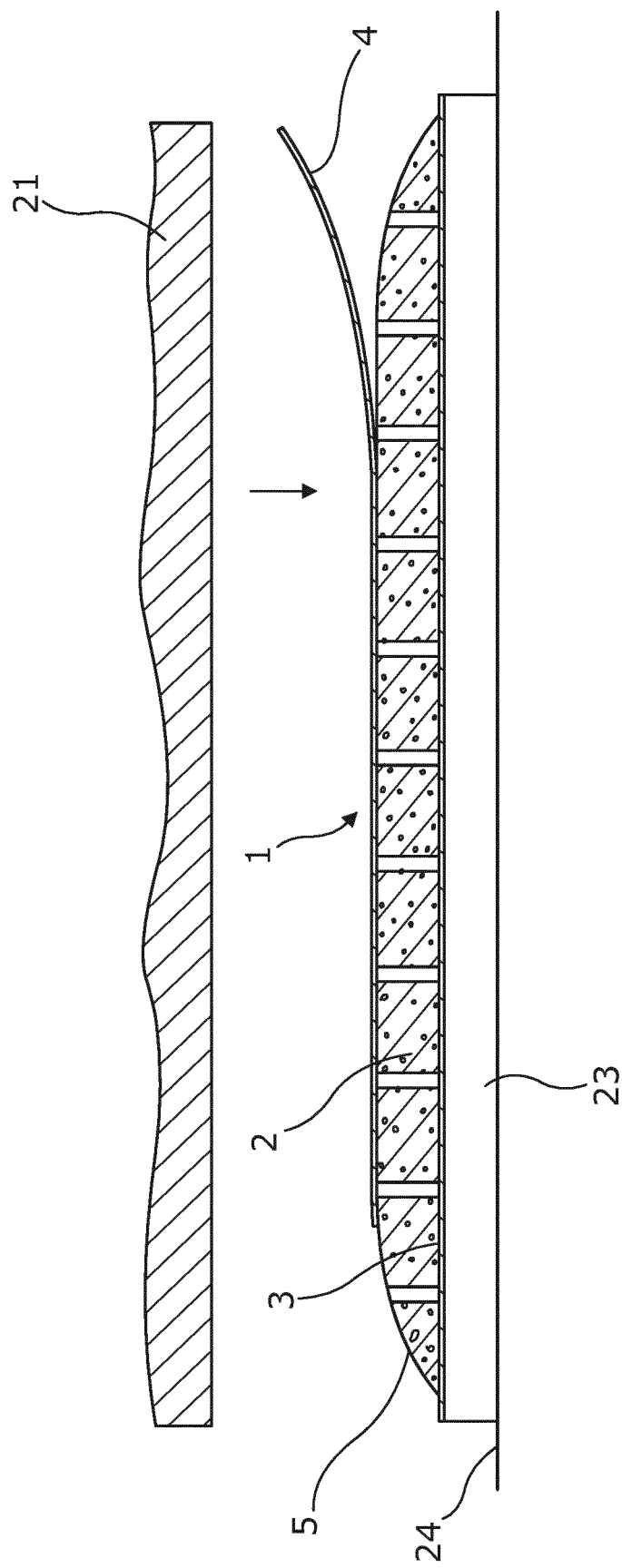

METHOD OF MANUFACTURING A FLEXIBLE, IMPACT-RESISTANT PAD

The present invention relates to a method of manufacturing a flexible, impact-resistant pad and to a laminated pad produced by such a method.

Flexible, impact-resistant laminates are widely used as protective material, pads of which are incorporated into clothing and the like to fashion protective wear for human and animal bodies. Such protective wear is used during sport, for example American football, rugby and equestrian sports, and in other activities where the wearer runs a risk of injury, for example building and other trades.

The pads may form an integral part of an item of clothing and be stitched or bonded to the clothing, for example a shoulder pad, or be provided separately for securement in a pocket in a garment or by a particular item of clothing, for example a shin pad which is held in place by a sock.

In WO01/03530 is described a method of manufacturing a flexible laminate comprising the following steps:
1. providing a sheet of a resilient material, such as a closed-cell foam;
2. cutting the sheet into a plurality of spaced, separate elements using a cutter which is pressed into the sheet to cut therethrough;
3. making one side of the spaced elements to stand proud of the surface of a jig provided to hold the elements in place;
4. removing excess resilient material from between the spaced, separate elements; and
5. bonding a flexible, resiliently stretchable substrate to one side of the separate elements by heating the substrate either to activate an adhesive applied between said one side of the separate elements and the substrate or to fuse the elements to the substrate.

One disadvantage of pads made by the aforementioned method is that they have square edges around the profile of the pad. When incorporated into clothing, this gives an unattractive appearance to the clothing as the edges around the pad are not streamlined. Streamlined edges to the pad would be more aesthetically pleasing and may also reduce air resistance and drag when the pad is worn.

The object of the present invention is to provide a method of manufacturing a flexible, impact-resistant pad that has at least one streamlined edge.

According to a first aspect of the present invention there is provided a method of manufacturing a flexible, impact-resistant pad comprising the steps of
  providing a sheet of an impact-absorbing material;
  cutting the sheet to provide a piece thereof with a profile required for the pad;
  cutting the piece into a plurality of spaced, separate elements;
  retaining said plurality of spaced, separate elements within the profile required for the pad;
  providing a first, flexible layer of material;
  bonding one side of the first, flexible layer of material to the spaced, separate elements;
  characterized in that at least part of the edge of the pad is streamlined by the following additional steps:
  providing a contoured mould tool defining a recess that has a three dimensional shape complementary to the shape required on one side of the pad and that has a streamlined edge around at least part of its periphery;
  heating the impact-absorbing material or the mould tool; and
  pressing the mould tool into the impact-absorbing material to mould the impact-absorbing material on one side to define the shape that is required.

A streamlined edge includes edges that are radiussed, tapered or chamfered and those that are shaped to reduce resistance to air or water flow over the pad. When incorporated into clothing, such a pad may enable an increase in speed or ease of movement for a person wearing the clothing.

Preferably, the additional steps are carried out prior to the cutting of the sheet of impact-absorbing material to provide the piece with the profile required for the pad. This enables a large sheet of impact-absorbing material to be used and the mould tool to define a plurality of individual mould tools each defining a recess so that a plurality of pieces can be moulded in a single pressing. After pressing, the moulded sheet is cut to separate the moulded pieces that may then be individually subjected to the further steps of the method.

Preferably also, each piece with a profile required for the pad is cut into the plurality of spaced, separate elements using a cutter which is pressed into the piece to cut therethrough, the cutter being adapted by the presence of ejectors that make the spaced, separate elements stand proud of the surface of the cutter.

Preferably also, the cutter comprises a plurality of cutter blades each with a polygonal or closed curve profile that are mounted on a board, the ejectors comprising blocks located within each of the cutter blades that each define an exposed surface at a level higher, relative to the cutter blades, than the level of the board surrounding the cutter blades.

Advantageously, the overall profile made by the cutter blades is similar to the profile required for the pad and the ejectors of the cutter that act on the elements around the periphery of the pad eject these peripheral elements to a greater extent than those acting on the other elements whereby an uppermost surface collectively defined by all of the elements standing proud of the surface of the cutter is substantially planar.

Preferably also, at least one of the opposing faces of the sheet of impact-absorbing material is covered with a hot-melt adhesive prior to cutting of the sheet. Said at least one adhesive-covered face is that which is bonded to said one side of the first, flexible layer of material. Alternatively, said one side of the first, flexible layer of material is covered with a hot-melt adhesive prior to its bonding to said one face of the impact-absorbing material. In either case, said one face of the impact-absorbing material which is bonded to say first flexible layer of material is preferably the face opposite to the side of the pad that is moulded to streamline the pad. This means that if the aforementioned additional steps are carried out prior to the cutting of the sheet of impact-absorbing material, then the moulded side of the pad is that which is placed adjacent the cutter.

Preferably also, the method comprises the further step of bonding a second flexible layer of material to the moulded side of the pad.

Preferably also, the second flexible layer of material is bonded to the moulded side of the pad in a heated press.

Preferably also, during bonding of the second flexible layer of material to the pad, the pad is supported on a yielding surface to enable the moulded side of the pad to flatten during bonding. Advantageously, the yielding surface is comprised of a spongy material. Flattening of the moulded side of the pad during bonding ensures an even bond of the second flexible layer of material to the elements. Alternatively, the heated press is provided with a shaped platen that accommodates the moulded side of the pad during bonding of the second flexible layer of material thereto.

Preferably also, the impact-absorbing material is a foam. Advantageously, the foam is a closed-cell foam.

Preferably also, the flexible layers of material to which the compact-resistant material is bonded comprise at least one of the following, namely a resiliently stretchable fabric, a knitted fabric, a woven fabric, a plastics sheeting.

According to second aspect of the present invention there is provided a flexible, impact-resistant pad manufactured in accordance with the first aspect of the present invention.

According to a third aspect of the present invention there is provided a flexible, impact-resistant pad comprising a first, flexible layer of material and a plurality of spaced, separate elements that are each comprised of an impact-absorbing material and that are bonded to one side of the first flexible layer of material, characterised in that at least some of the elements adjacent the edge of the pad are streamlined around at least part of the periphery of the pad.

The various aspects of the present invention will now be described by way of example with reference to the accompanying drawings, in which:

FIG. 9 is a diagram showing bonding of a second, flexible layer of material to the other side of the spaced, separate elements.

Figure 1:
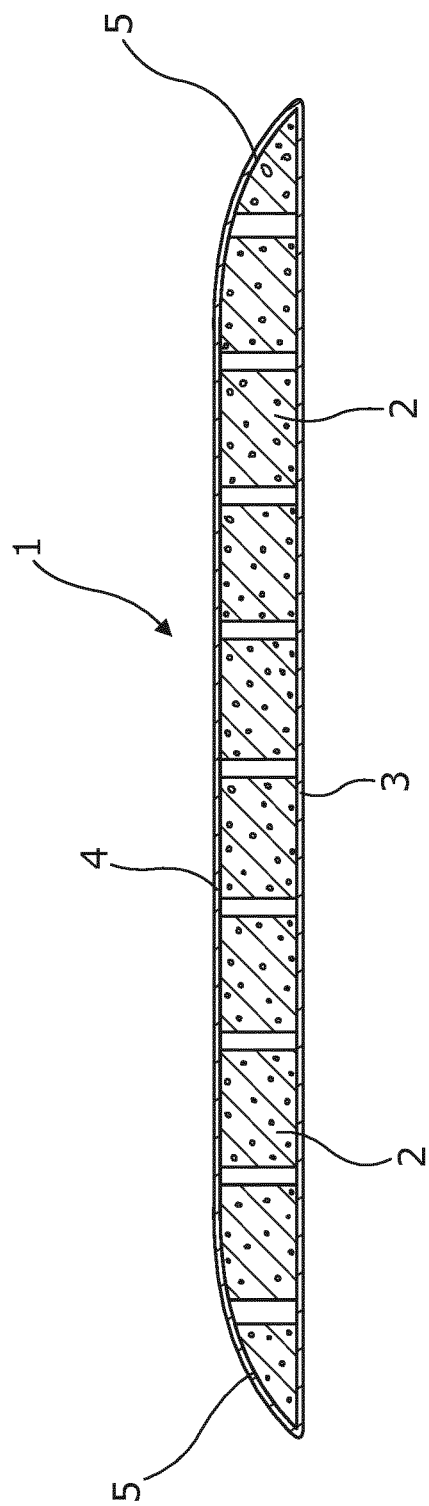
FIG. 1 is a schematic cross-sectional view through a pad manufactured in accordance with the method of the present invention.

A flexible, impact-resistant pad 1 manufactured according to the present invention is a laminate comprising a plurality of spaced, separate elements 2 that are made of an impact-absorbing material and that are located between and bonded to first and second layers 3 and 4 respectively of a flexible material, although in some embodiments bonding of the second layer 4 of flexible material to the elements 2 may be omitted. The pad 1 that is shown in FIG. 1 comprises the first and second layers 3 and 4 and it can be seen that the side of the pad 1 are generally planar but that the edge 5 on one side of the pad 1 is streamlined, for example by being radiussed, tapered or chamfered. This streamlining ensures that when the pad 1 is incorporated into clothing or worn the area of clothing covering the pad appears smooth rather than lumpy and the aesthetic appeal of the clothing is not compromised. This makes the clothing more comfortable to wear and also reduces wind resistance and drag, which may be important factors that have to be taken into account in some sports clothing. The pad 1 may be sewn or otherwise secured to clothing parts or other material dependent on the use to which it is to be put. In some embodiments, one of the layers 3, 4 may form part of a garment. In other embodiments, a margin of one or both layers 3, 4 may be provided around the periphery of the pad 1 to provide an area for attachment of the pad 1 to part of a garment.

The elements 2 are comprised of an impact-absorbing material, which is preferably a foam and advantageously a closed-cell foam. Such a closed-cell foam may be a polyethylene foam and the elements 2 may comprise polygonal shapes that are evenly distributed with a density of between 100 and 8000 elements/m$^2$. For some applications, the density can be lower than for use in pads 1 for protective wear as the greater the density, the greater the flexibility of the pad. For use in protective wear a density between 2000 and 6000 elements/m$^2$ is preferable as it allows the pad to flex easily in all directions without "locking up" or preventing movement in a particular direction. Preferably, the elements 2 are evenly arranged, each element 2 being spaced from adjacent elements 1 by between 1 mm and 4 mm. In most but not all pads 1 for use in clothing, the elements 2 will be between 12 mm and 25 mm wide.

The flexible layers of material 3 and 4 to which the elements 2 are bonded preferably comprise at least one of the following, namely a resiliently stretchable fabric, a knitted fabric, a woven fabric, a plastics sheeting. If the pad is to be used in the production of protective wear or upholstery, the layers 3 and 4 are preferably made of a resiliently stretchable knitted fabric, advantageously one comprising polyester or elastane fibres. Using stretchable fabrics helps to prevent puckering of one side of the pad 1 when it is flexed. Also, such fabrics are breathable making wearing of the pad 1 comfortable as the pad 1 will then allow evaporation of sweat to occur from the skin beneath the pad 1. However, in other applications, the layers 3 and 3 can be made of a hard-wearing knitted or woven fabric or film, that does not need to be stretchable and that may be waterproof. Suitable films include plastics films such as sheets of polyethylene or polyurethane.

Figure 4:
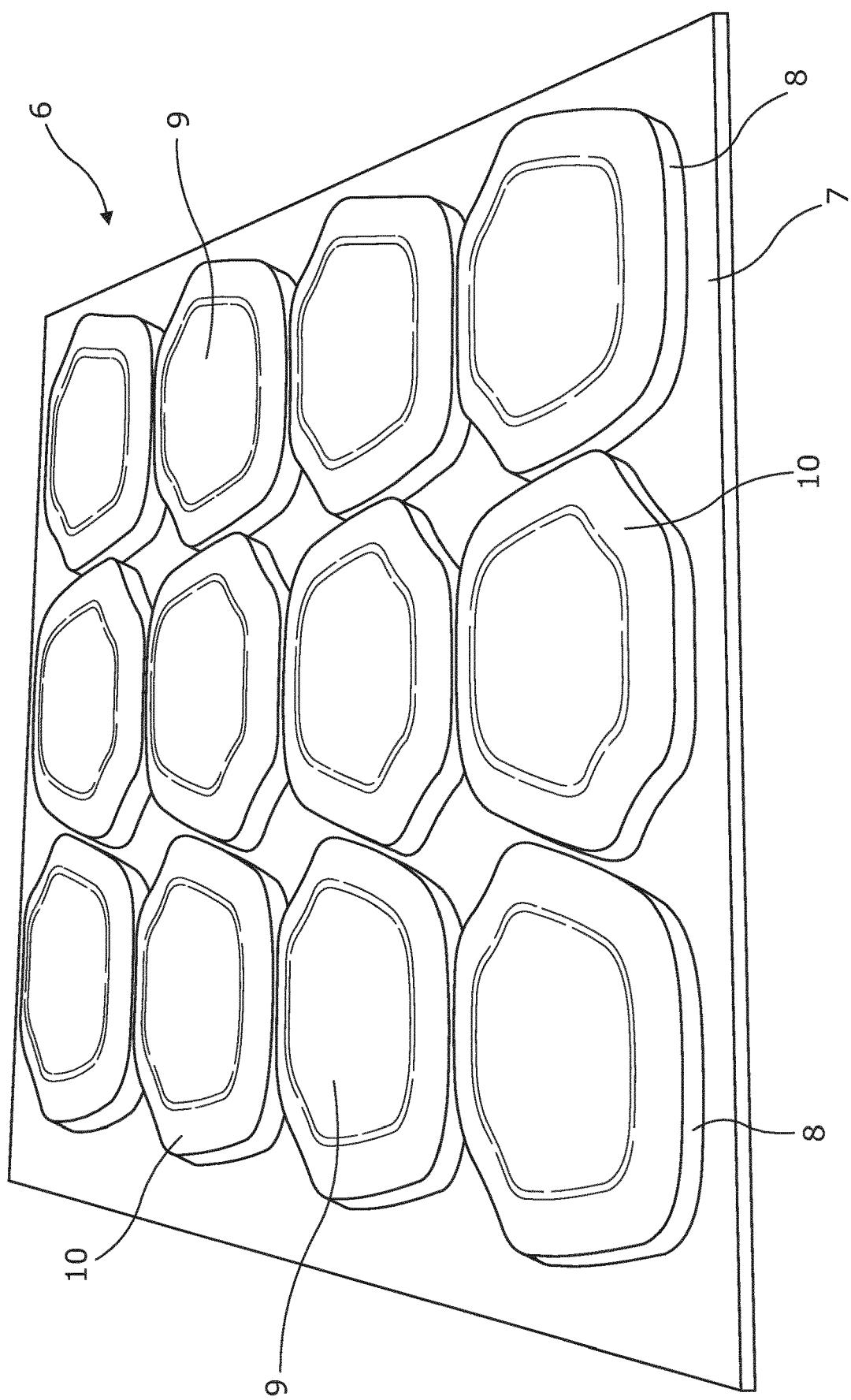
FIG. 4 is a perspective view of a mould tool for use in the method of the present invention.

FIG. 4 is a perspective view of an embodiment of mould tool 6 for use in the method of the present invention that is described below. The illustrated mould tool 6 comprises a backboard 7 to which are secured a plurality of separate, individual mould tools 8 each of which is used to mould a piece of the impact-absorbing material that is cut into the elements 2. As indicated above, the use of a mould tool 6 comprising a plurality of individual mould tools 8 increases the efficiency of the method as it enables a large sheet of impact-absorbing material to be used and moulded into a plurality of pieces in a single pressing. The individual mould tools 8 may all be the same shape and size or may be varied as required, for example several differently sized and shaped pieces may be moulded in one operation for use in a single or different garments. In all cases, however, each mould tool 8 is contoured to define a recess 9 with a streamlined edge 10 around at least part of its periphery.

Figure 5:
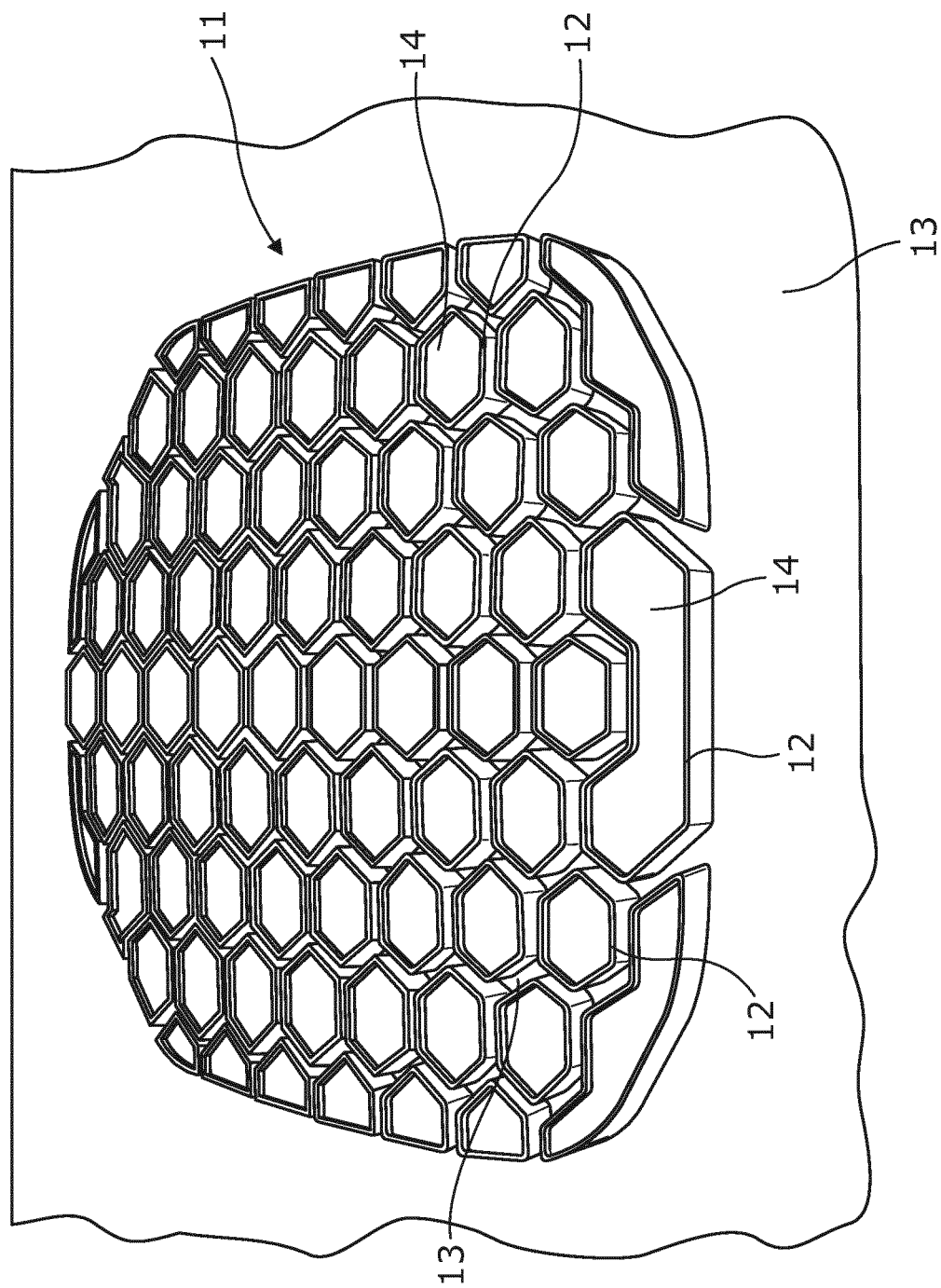
FIG. 5 is a perspective view of a cutter for use in the method of the present invention.

FIG. 5 shows a perspective view of an embodiment of cutter 11 for use in the method of the present invention that is described below. The cutter 11 comprises a plurality of blades 12 with a polygonal or closed profile that are mounted on a board 13. The size and spacing of the blades 12 determines the size and spacing of the elements 2. In the present embodiment, other than at the edges of the cutter 11, the blades 12 each define a hexagonal profile but it will be appreciated that any appropriate blade profile could be used. Advantageously, the overall profile made by the cutter blades is similar to the profile required for the pad and around its the edges, the closed profile blades 12 are shaped to fill out this profile and so may comprise a variety of polygonal shapes. The height of the blades 12 is preferably arranged to be slightly smaller than the thickness of the impact-absorbing sheet with which the cutter 10 is to be used. This means that when the cutter 10 is used to cut the sheet, the sheet is compressed during cutting but thereafter resiles or recovers so that its upper surface lies above the edges of the blades 12, which are wholly enclosed within the cuts in the sheet. However, alternative arrangements are possible wherein the height of the blades 12 is made equal to or greater than the thickness of the impact-absorbing sheet to ensure that unwanted material is retained within the cutter after the elements 2 have been cut therefrom.

Figure 6:
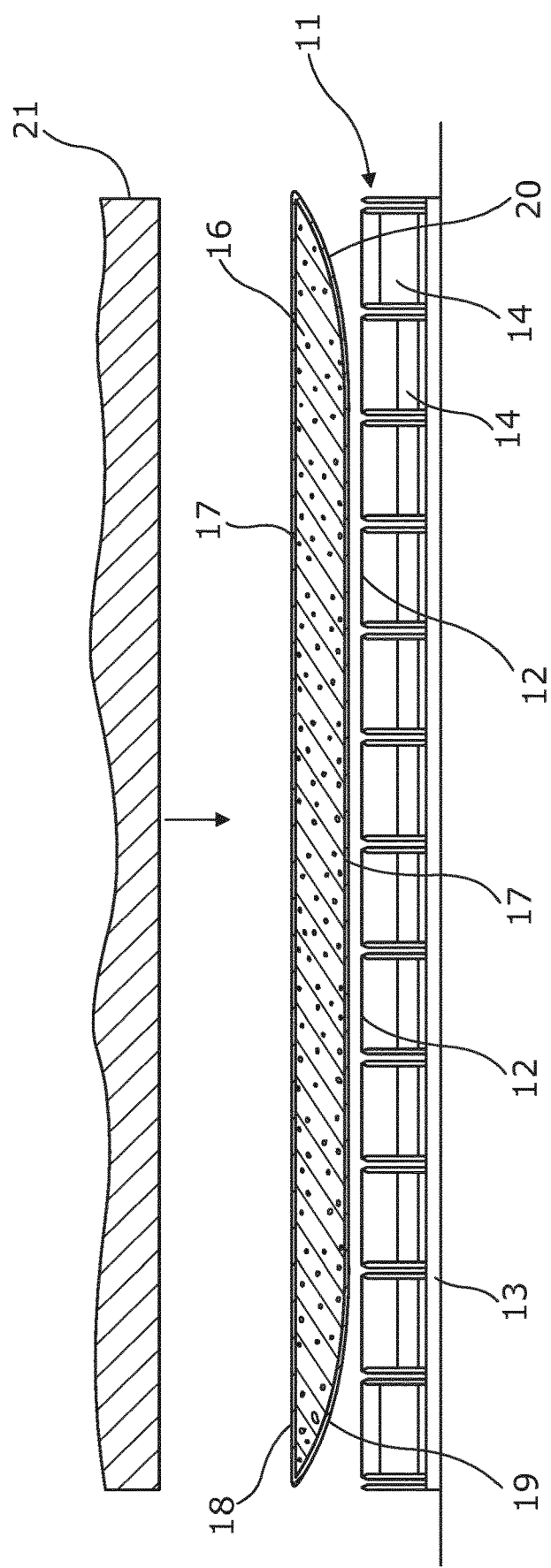
FIG. 6 is a diagram showing cutting of a piece of impact-absorbing material into a plurality of spaced, separate elements using a cutter as shown in FIG. 5.
Figure 8:
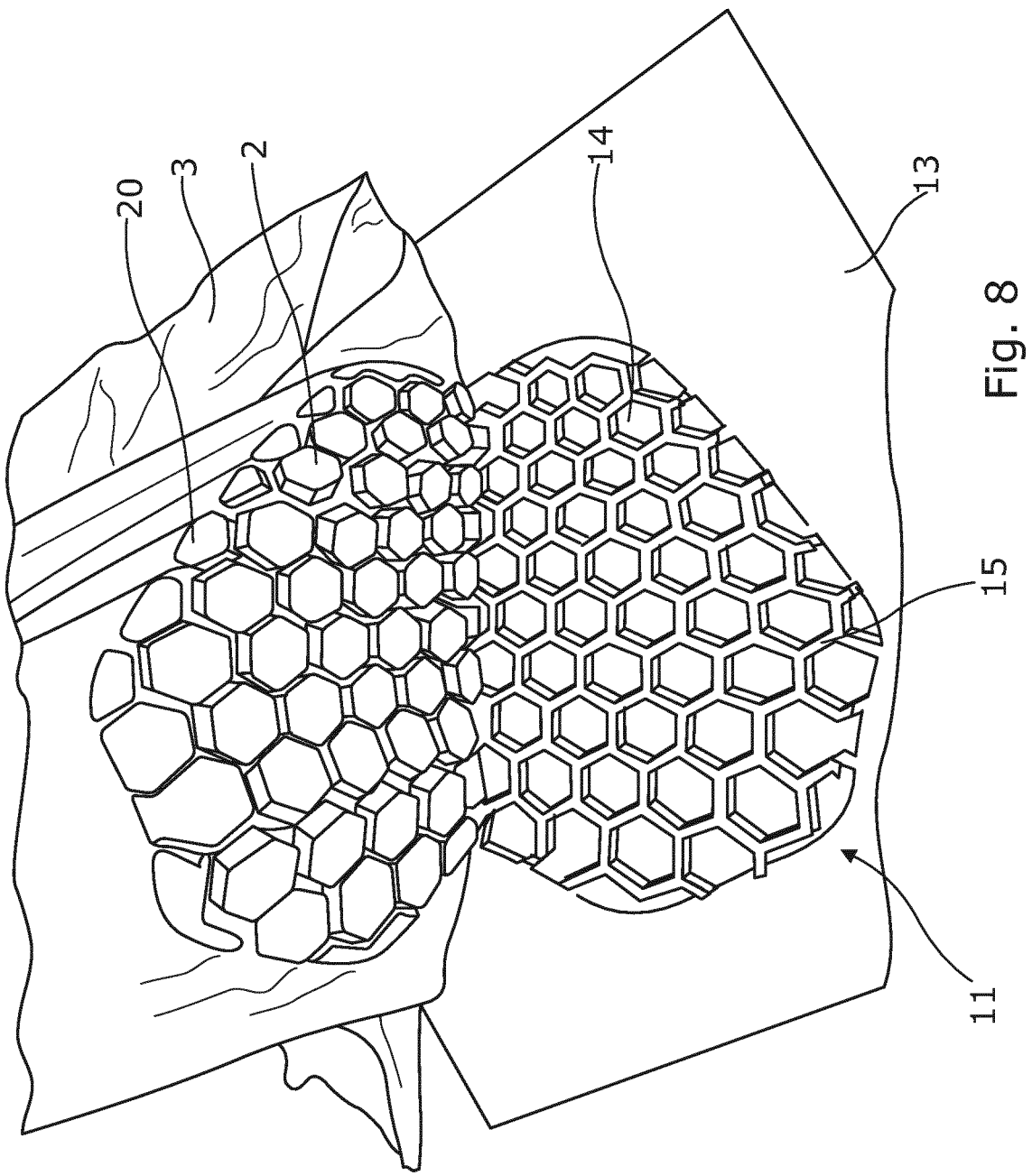
FIG. 8 is a diagram showing the removal of the first, flexible layer of material and the elements bonded thereto from the cutter.

Preferably, as shown in FIG. 6, within each of the cutter blades 12 is an ejector 14 in the form of a block which has an exposed surface at a level higher relative to the blades 12 than the upper level of the board 13 surrounding the blades 12. This means that after cutting of the impact resistance sheet into the separate elements 2, which are the parts of the cut sheet within the closed profile blades 12, these elements 2 are raised above the level of the parts of the sheet between the blades 12. These parts usually form a one-piece matrix 15, as shown in FIG. 8 that is left behind in the cutter 11 after use for subsequent removal. Although all the ejectors 14 may be made the same height, more preferably when moulding of the impact-absorbing sheet is carried out prior to the cutting of the sheet the ejectors 14 of the blades 12 that act on the elements 2 cut out around the periphery of the cutter profile are adapted to eject these peripheral elements 2 to a greater extent than those acting on the other elements 2. This is because the thickness of these peripheral elements is smaller than the rest as a result of the moulding process and it is important when bonding the first flexible material 3 thereto that the uppermost surface collectively defined by all of the elements 2 standing proud of the surface of the cutter 11 is substantially planar.

The steps involved in manufacturing the pad 1 using the mould tool 6 and the cutter 11 described above will now be described in more detail with reference to the sequence formed by FIGS. 6 to 9.

Figure 2:
FIG. 2 is a perspective view of a cut and moulded piece of a flexible, impact-resistant material.
Figure 3:
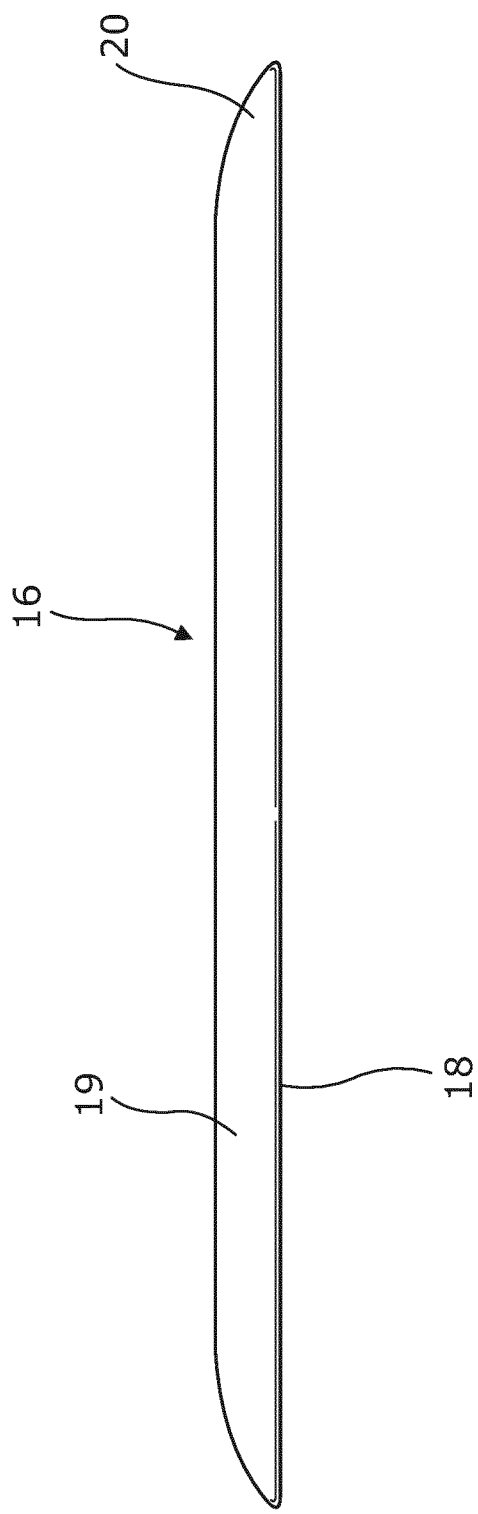
FIG. 3 is a side view of the pad shown in FIG. 2.

In order to make the pad 1, it is necessary to produce a piece 16 of an impact-absorbing material that has been cut and moulded into the profile desired for the pad, as shown in FIGS. 2 and 3. This may be accomplished as follows. First, both sides of a sheet of impact-absorbing material such as a closed-cell foam are coated with a layer 17 of a hot melt adhesive. Such adhesives are known to those skilled in the art and usually have an activation temperature of around 130° C. The adhesive layers 17 may be applied to the sheet in the form of a liquid, a powder or a film but if applied in a liquid form, the adhesive layers 17 must be left to dry before the further steps of the method can be carried out. The next step is the moulding of the sheet using the mould tool 6 to produce the piece 16. However, first either the mould tool 6 or the sheet is heated to a temperature that is lower than the activation temperature of the adhesive 17 but which may, for example, be up to around 125° C. In other methods, the temperature may be higher but then the surface of the mould tool is preferably provided with a non-stick coating. Preferably, however, it is the sheet that is heated and the mould tool 6 is then cold-pressed into one side of the sheet 16. This moulds the material on this one side of the sheet so that it defines a plurality of shapes that have a contours complementary to the shapes of the recesses 9 defined by the individual mould tools 8. These shapes are now cut out from the sheet to provide individual pieces 16 that each have a shape on one side as required for the pad 1 under manufacture. It will be appreciated, as indicated above, that the mould tool 6 may be provided with only one or a plurality of individual tools 8 as required.

Figure 7:
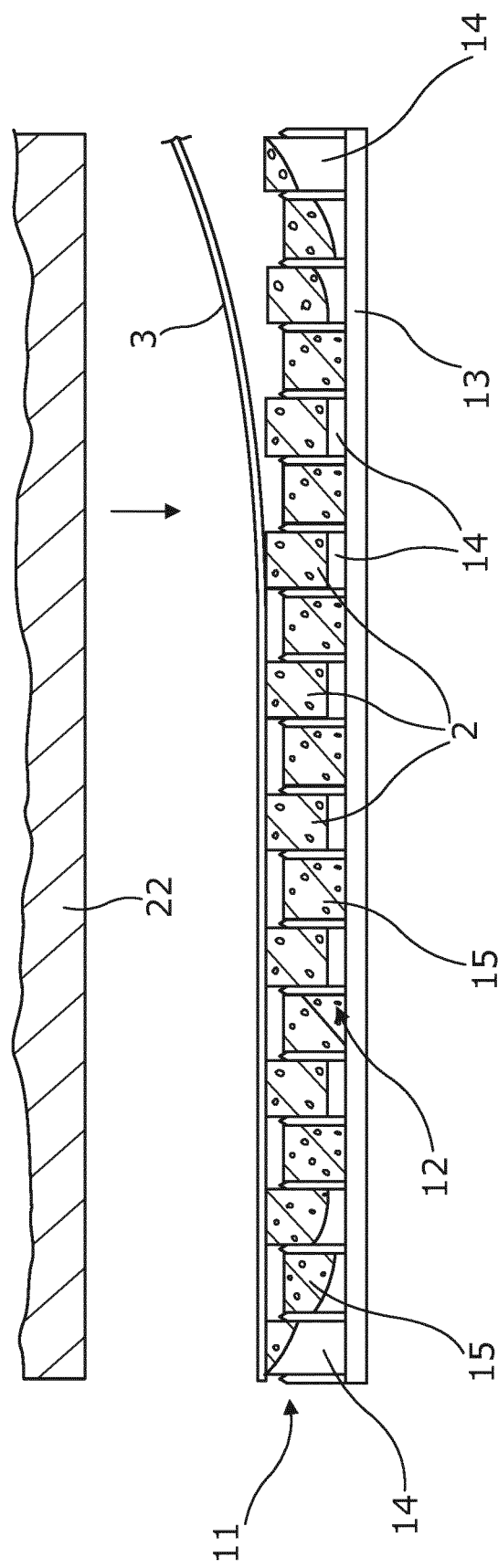
FIG. 7 is a diagram showing bonding of a first, flexible layer of material to one side of the spaced, separate elements produced as shown in FIG. 6.

The moulded piece 16 of impact-absorbing material now has a flat surface 18 and a moulded surface 19 which has streamlined edges 20. The moulded piece 16 is then placed over the cutter 11, as described above, with the moulded surface 19 face down adjacent the cutter blares 1. A cold press 21 is now used to uniformly press the moulded piece 16 down into the cutter 11 so that the cutter blades 12 cut through the piece 16, as shown schematically in FIG. 6. A flat cutting board (not shown) may be placed over the foam before using the press to prevent the blades 12 of the cutter 11 damaging the press. Pressing of the piece 16 into cutter 11 by the press cuts the piece 16 into the plurality of separate, spaced elements 2, which are formed by the parts of the piece 16 within the cutter blades 12, and the cellular matrix 15, which is waste material located outside the cutter blades 12. Once the press 21 is removed, the impact-absorbing material of the piece 16 will resile owing to its springy nature, so that its upper surface stands proud above the upper edges of the cutter blades 12. In addition, owing to the presence of the ejectors 14, the upper surface of the elements 2 within the cutter blades 12 are pushed upwards so that they stand proud of the upper surface of the matrix 15, as shown in FIG. 7. The cutter 11 now acts as a jig, which retains the elements 2 in position within the required profile of the pad 1.

A first, flexible layer of material 3, as described above, is placed over the elements 2 and the cutter 11. In view of the difference in height between the matrix 15 and the elements 2, the lower surface of the material 3 only contacts the upper surface of the elements 2. A heated platen 22 is now brought into contact with upper surface of the material 3 and heat is conducted through the material 3 to the elements in order to activate the adjacent adhesive layer 17. This bonds the material 3 to the elements 2 but not to the matrix 15. Once the adhesive layer 17 has been activated, the material 3 can be lifted away from the cutter 11 taking the elements 2 along with it and leaving the waste matrix 15 behind, as shown in FIG. 8. The waste matrix 15 can now be removed from the cutter 11 and may be scrapped.

The material 3 surrounding the elements 2, which are grouped together in the profile of the pad 1 may now be trimmed away but leaving a small margin to enable the pad 1 to be attached to another piece of material that covers the exposed elements 2. This piece of material may form part of a piece of clothing. Preferably, however, the exposed elements 2 are covered by the second, flexible layer of material 4 that is bonded to them, as will now be described, to produce the pad 1 which can then be either incorporated into an item or wear or used alone as an impact-absorbing pad.

As shown in FIG. 9, in order to bond the second layer of material 4 to the elements, the material 3 and attached elements 2 are placed on and supported by a yielding surface to enable the moulded side of the elements 2 to flatten during bonding. It will be appreciated that in this example the moulded surface of the elements 2 is that which is not bonded to the material 3. Advantageously, the yielding surface is comprised of a block of spongy material which is supported on a hard surface 24 and the material 3 is laid on it so that the moulded surfaces of the elements 2 are uppermost. The second, flexible layer of material 4 is placed over the elements 2 and a heated platen 22 is brought into contact with upper surface of the material 4 so that heat is conducted through the material 4 to the elements in order to activate the adjacent adhesive layer 17. This bonds the material 4 to the elements 2. In view of the yielding surface 23, the moulded sides of the elements 2 flatten under the pressure of the platen 22. This ensures that an even bond is made with the second flexible layer of material 4, with no puckering of the material 4. However, alternatively, the platen 22 could be shaped so as to be complementary to that of the elements, which will be similar to the contoured profile of the individual mould tools 8. This moulded platen would then accommodate the moulded side of the elements 2 during bonding of the second flexible layer of material 4 thereto. However, such an alternative will require registration of the elements 2 with the profiled platen 22 and is therefore not as easy to put into practice as a method using the yielding surface 23. In another alternative, it may be possible to dispense with the yielding surface if the heated platen 22 is applied with a sufficiently high pressure to flatten out the upper surface of the material 4. It will be appreciated that this will depend on the resilience of the elements 2 and the their thickness.

Apart from the foregoing alternative, there are alternatives to other parts of the method of manufacture as will now be described. However, each of these alternatives has disadvantages as compared with the method described above, as will also be described.

First, instead of coating the both sides of the sheet 16 of impact-absorbing material with a layer 17 of a hot melt adhesive, the hot melt adhesive is applied instead to one side of each of the first and second flexible layers of material 3 and 4. The disadvantage of this alternative is that the areas of the layers of material 3 and 4 that are not bonded to the elements 2 are still coated with the adhesive, which may seal the material 3 and 4 and therefore adversely affect its breathability and the stretchability of the material 3, 4 between the elements 2.

Second, the moulding of the impact-absorbing material by an individual mould tool 8 to form the streamlined edges may take place after bonding of the first, flexible layer of material 3 to the spaced, separate elements 2 as opposed to initially before the sheet 16 of impact-absorbing material has been cut into the elements 2 as described above. This is done after removal of the material 3 to which the elements 3 are bonded from a cutter that is similar to the cutter 11 described above but which does not need to have ejectors 14 of a different height to accommodate the moulded elements 2 around the periphery of the pad's profile. The material 3 is secured to a board, for example by pins, with the elements 2 uppermost and the elements 2 are then heated and to a temperature that is lower than the activation temperature of the adhesive 17 used to bond the elements 2 to the material 3. As before, this will be up to around 125° C. The mould tool 8 is then cold-pressed into the elements 2. It will be appreciated that there must be a precise registration of the mould tool 8 to the elements 2 to ensure the latter's accurate moulding and shaping. After moulding, the second sheet of flexible material 4 can be secured to the elements 2 as described above. However, this alternative method has several disadvantages. In particular, moulding process tends to shrink and/or distort the elements 2 and alters the spacing between them. As they are already attached to the layer of material 3, this can cause puckering of the material 3. Also, the shapes of the elements 2 around the periphery of the pad 1 tend be distorted so that they bulge out sideways in all directions. This means that parts of the elements 2 around the edges of the pad 1 are not bonded to the material 3. Such bulging is disadvantageous in use of the pad 1 as it tends to make adjacent elements 2 around the periphery of the pad 1 fuse or lock together, which reduces the flexibility of the pad 1. If the first flexible layer of material 3 is permeable, the breathability of the pad 1 is also reduced. For all these reasons, therefore, this alternative method, whilst possible is generally not advisable.

Finally, as an addition to all of the aforementioned methods, one or both of the first and second layers of material 3, 4 may be surface treated on the surface that is or is to be the outer surface of the pad 1 either before or after bonding to the elements 2. Such surface treatments may include coating of the material 3, 4 to provide abrasion resistance, waterproofing or stain-resistance, for example by screen-printing.

Alternatively, the additional steps are carried out after bonding said one side of the first, flexible layer of material to the spaced, separate elements. However, this alternative has several disadvantages. In particular, the moulding of the impact-absorbing material tends to shrink and/or distort the elements and alters the spacing between them. In particular, the impact-absorbing material of the elements around the periphery of the pad tends be distorted so that it bulges out sideways in all directions. This means that some of the impact-absorbing material around the edges of the pad is not bonded to the first flexible layer of material. Also, it tends to make adjacent elements around the periphery of the pad fuse or lock together, which reduces the flexibility of the pad when in use. If the first flexible layer of material is permeable, the breathability of the pad is also reduced.

The invention claimed is:

1. A method of manufacturing a flexible, impact-resistant pad comprising the steps of
    providing a sheet of an impact-absorbing material;
    cutting the sheet to provide a piece thereof with a profile required for the pad;
    cutting the piece into a plurality of spaced, separate elements:
    retaining said plurality of spaced, separate elements within the profile required for the pad;
    providing a first, flexible layer of material;
    bonding one side of the first, flexible layer of material to the spaced, separate elements;
    at least part of an edge of the pad being streamlined by the following additional steps:
        providing a contoured mould tool defining a recess that has a three dimensional shape complementary to a shape required on one side of the pad and that has a streamlined edge around at least part of its periphery;
        heating the impact-absorbing material of the spaced, separate elements or the mould tool; and
        pressing the mould tool into the impact-absorbing material of the spaced, separate elements to mould the impact-absorbing material of the spaced, separate elements on one side to define the shape that is required;
    wherein the piece with the profile required for the pad is cut into the plurality of spaced, separate elements using a cutter which is pressed into the impact-absorbing material of the piece to cut therethrough, the cutter being adapted by the presence of ejectors that make the spaced, separate elements stand proud of a surface of the cutter;
    wherein the cutter comprises a plurality of cutter blades each with a polygonal or closed curve profile that are mounted on a board, the ejectors comprising blocks located within each of the cutter blades that each define an exposed surface at a level higher, relative to the cutter blades, than a level of the board surrounding the cutter blades; and
    wherein an overall profile made by the cutter blades is similar to the profile required for the pad and the ejectors of the cutter that act on the elements around the periphery of the pad, the spaced, separate elements located around a periphery of the pad each form a peripheral element and the ejectors of the cutter that act on the peripheral elements eject the peripheral elements to a greater extent than the ejectors acting on other spaced, separate elements, of the spaced, separate elements, whereby an uppermost surface collectively defined by all of the spaced, separate elements standing proud of the surface of the cutter is substantially planar.

2. A method as claimed in claim 1, wherein the additional steps are carried out prior to the cutting of the sheet of impact-absorbing material to provide the piece with the profile required tier the pad.

3. A method as claimed in claim 2, wherein the sheet of impact-absorbing material is moulded to provide a plurality of moulded pieces that are then cut out from the sheet to provide a plurality of the pieces each with the profile required for a plurality of the pads.

4. A method as claimed in claim , wherein the overall profile made by the cutter blades is similar to the profile required for the pad and the ejectors of the cutter all have the same height.

5. A method as claimed claim 1, wherein each said spaced, separate element is spaced from adjacent said spaced, separate elements by between 1 mm and 4 mm and is between 12 mm and 25 mm wide.

6. A method as claimed in claim 1, wherein at least one of opposing faces of the sheet of impact-absorbing material is covered with a hot-melt adhesive prior to cutting of the sheet, thereafter at least e opposing face of the spaced, separate elements covered with the adhesive.

7. A method as claimed in claim 1, wherein said one side of the first, flexible layer of material is covered with a hot-melt adhesive prior to its bonding to said side of the impact-absorbing material spaced, separate elements.

8. A method as claimed in claim 6, wherein said at least one face of the impact-absorbing material which is bonded to said first, flexible layer of material is a side opposite to the side of the pad that is moulded to streamline the pad.

9. A method as claimed in claim 1, wherein the method comprises a further step of bonding a second flexible layer of material to a moulded side of the pad.

10. A method as claimed in claim 9, wherein the second flexible layer of material is bonded to said moulded side of the pad in a heated press.

11. A method as claimed in claim 9, wherein during bonding of the second flexible layer of material to the pad, the pad is supported on a yielding surface to enable said moulded side of the pad to flatten during bonding.

12. A method as claimed in claim 11. wherein the yielding surface is comprised of a spongy material.

13. A method as claimed in claim 10, wherein the heated press is provided with a shaped platen that accommodates said moulded side of the pad during bonding of the second flexible layer of material thereto.

14. A method as claimed in claim 1, wherein the impact-absorbing material is a closed-cell foam and wherein the first flexible layer of material comprise at least one of the following: a resiliently stretchable fabric, a knitted fabric, a woven fabric, and a plastics sheeting.

* * * * *